United States Patent
Shin et al.

(10) Patent No.: US 10,432,345 B2
(45) Date of Patent: Oct. 1, 2019

(54) METHOD AND DEVICE FOR TRANSMITTING AND RECEIVING DATA USING NON-ORTHOGONAL MULTIPLE ACCESS IN WIRELESS COMMUNICATION SYSTEM

(71) Applicant: LG ELECTRONICS INC., Seoul (KR)

(72) Inventors: Seokmin Shin, Seoul (KR); Kijun Kim, Seoul (KR); Hyungtae Kim, Seoul (KR); Inkwon Seo, Seoul (KR); Yunjung Yi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/560,828

(22) PCT Filed: Mar. 22, 2016

(86) PCT No.: PCT/KR2016/002849
§ 371 (c)(1),
(2) Date: Sep. 22, 2017

(87) PCT Pub. No.: WO2016/153250
PCT Pub. Date: Sep. 29, 2016

(65) Prior Publication Data
US 2018/0115386 A1   Apr. 26, 2018

Related U.S. Application Data

(60) Provisional application No. 62/137,210, filed on Mar. 23, 2015.

(51) Int. Cl.
| | |
|---|---|
| *H04L 1/00* | (2006.01) |
| *H04L 27/00* | (2006.01) |
| *H04L 27/26* | (2006.01) |
| *H04W 52/14* | (2009.01) |
| *H04L 5/00* | (2006.01) |
| *H04L 27/34* | (2006.01) |

(52) U.S. Cl.
CPC .......... *H04L 1/0003* (2013.01); *H04L 1/0009* (2013.01); *H04L 1/0015* (2013.01);
(Continued)

(58) Field of Classification Search
CPC ..................................................... H04L 1/0003
See application file for complete search history.

(56) References Cited

U.S. PATENT DOCUMENTS

| | | |
|---|---|---|
| 2009/0141775 A1 | 6/2009 | Kober et al. |
| 2011/0092241 A1* | 4/2011 | Kawai ................. H04B 7/0404 |
| | | 455/509 |

(Continued)

FOREIGN PATENT DOCUMENTS

| | | |
|---|---|---|
| EP | 2983406 A1 | 2/2016 |
| KR | 10-2014-0125643 A | 10/2014 |

(Continued)

OTHER PUBLICATIONS

Benjebbour et al., "Concept and Practical Considerations of Non-orthogonal Multiple Access (NOMA) for Future Radio Access," IEEE, 2013, XP032541968, pp. 770-774.

(Continued)

*Primary Examiner* — Brandon M Renner
*Assistant Examiner* — Abdeltif Ajid
(74) *Attorney, Agent, or Firm* — Birch, Stewart, Kolasch & Birch, LLP

(57) ABSTRACT

The present specification relates to a method for transmitting and receiving data using non-orthogonal multiple access in a wireless communication system, which is performed by a base station, the method comprising: configuring a first modulation scheme and first transmission power for a first signal to be transmitted to a first terminal; configuring a second modulation scheme and second transmission power for a second signal to be transmitted to a second terminal;

(Continued)

transmitting the first signal and the second signal through the same time-frequency resource; and transmitting, to the second terminal, control information related to the cancellation of interference caused by the first signal.

6 Claims, 12 Drawing Sheets

(52) U.S. Cl.
CPC .......... *H04L 5/0053* (2013.01); *H04L 5/0091* (2013.01); *H04L 27/00* (2013.01); *H04L 27/0008* (2013.01); *H04L 27/26* (2013.01); *H04W 52/143* (2013.01); *H04L 5/001* (2013.01); *H04L 27/34* (2013.01)

(56) References Cited

U.S. PATENT DOCUMENTS

| 2011/0235735 | A1* | 9/2011 | Sari | H04B 7/0682 |
| | | | | 375/267 |
| 2012/0230301 | A1 | 9/2012 | Medles et al. | |
| 2013/0028350 | A1* | 1/2013 | Tsunoda | H04L 27/0008 |
| | | | | 375/307 |
| 2014/0050279 | A1* | 2/2014 | Kishiyama | H04J 11/004 |
| | | | | 375/285 |
| 2016/0037460 | A1* | 2/2016 | Benjebbour | H04L 1/0003 |
| | | | | 370/329 |
| 2016/0050634 | A1* | 2/2016 | Seok | H04W 52/146 |
| | | | | 370/338 |
| 2017/0339709 | A1* | 11/2017 | Zhang | H04B 7/0671 |

FOREIGN PATENT DOCUMENTS

| WO | WO 2013/176042 A1 | 11/2013 |
| WO | WO 2014/162819 A1 | 10/2014 |

OTHER PUBLICATIONS

Saito et al., "Non-Orthogonal Multiple Access (NOMA) for Cellular Future Radio Access," IEEE, 2013, XP055348983, 5 pages.

* cited by examiner

[Figure 1]
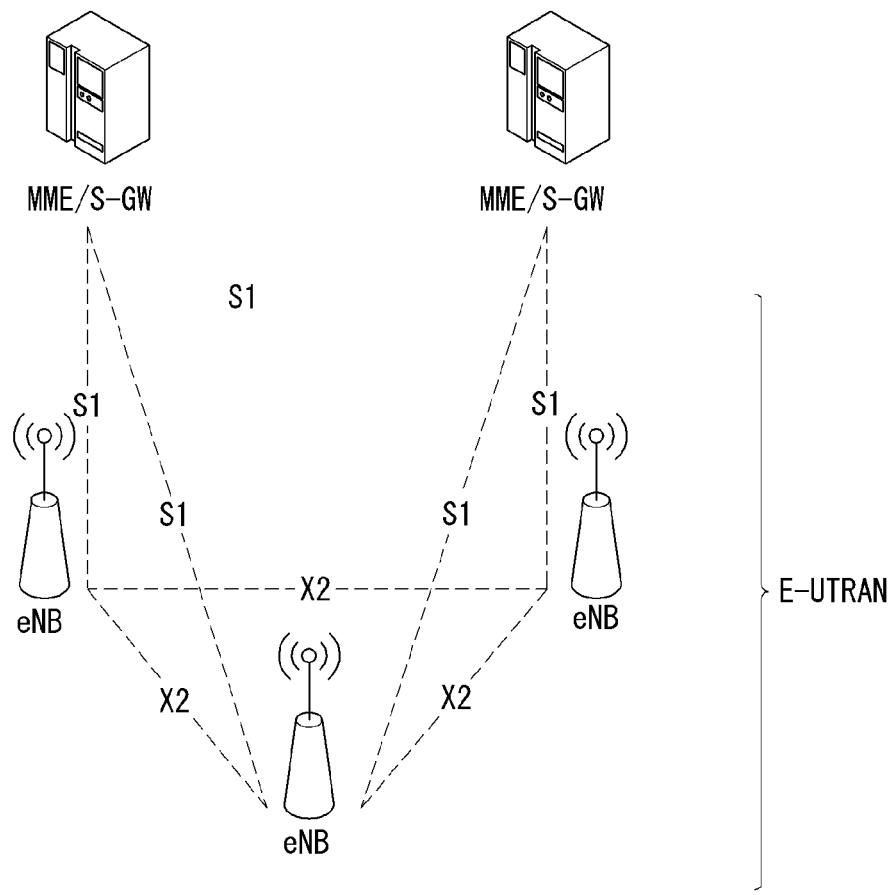

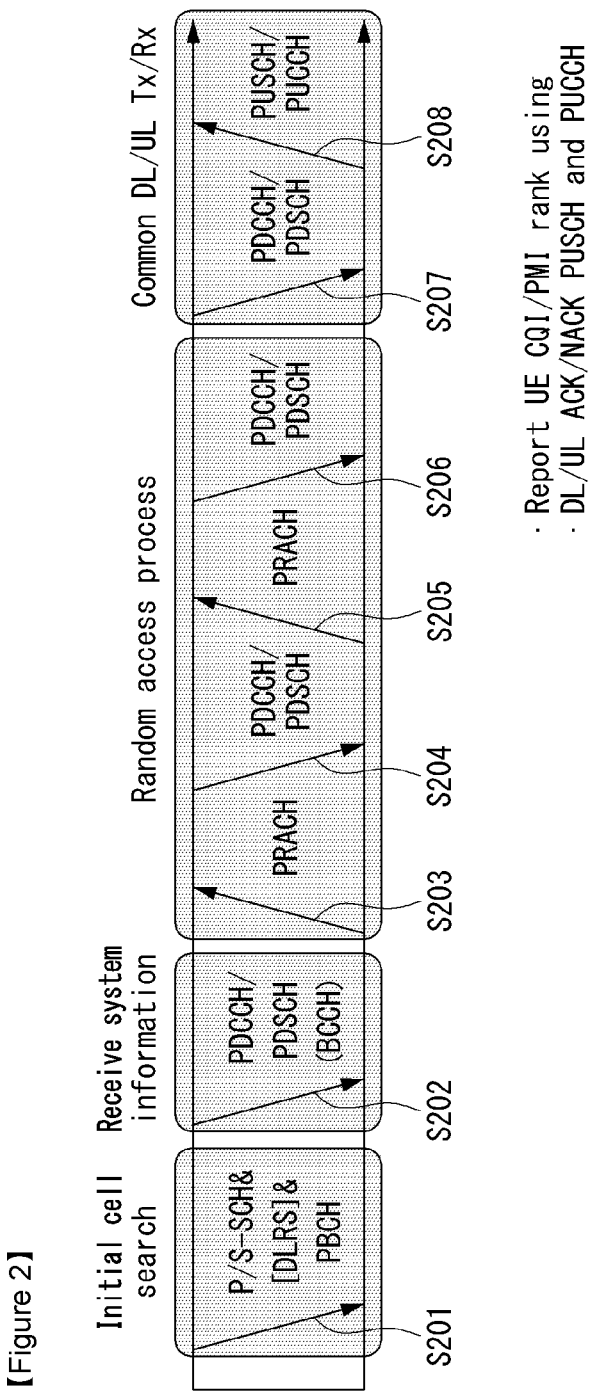
[Figure 2]

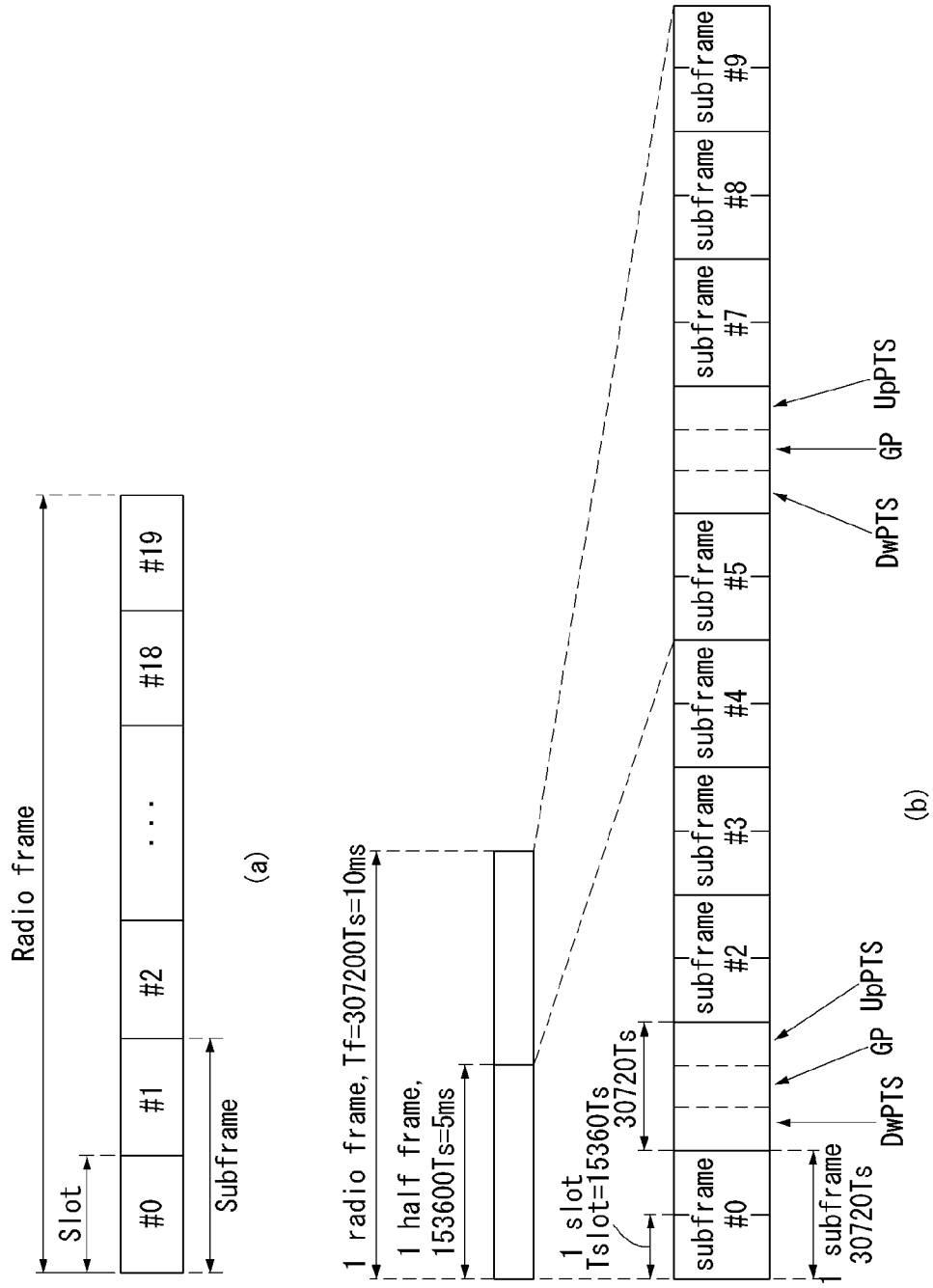

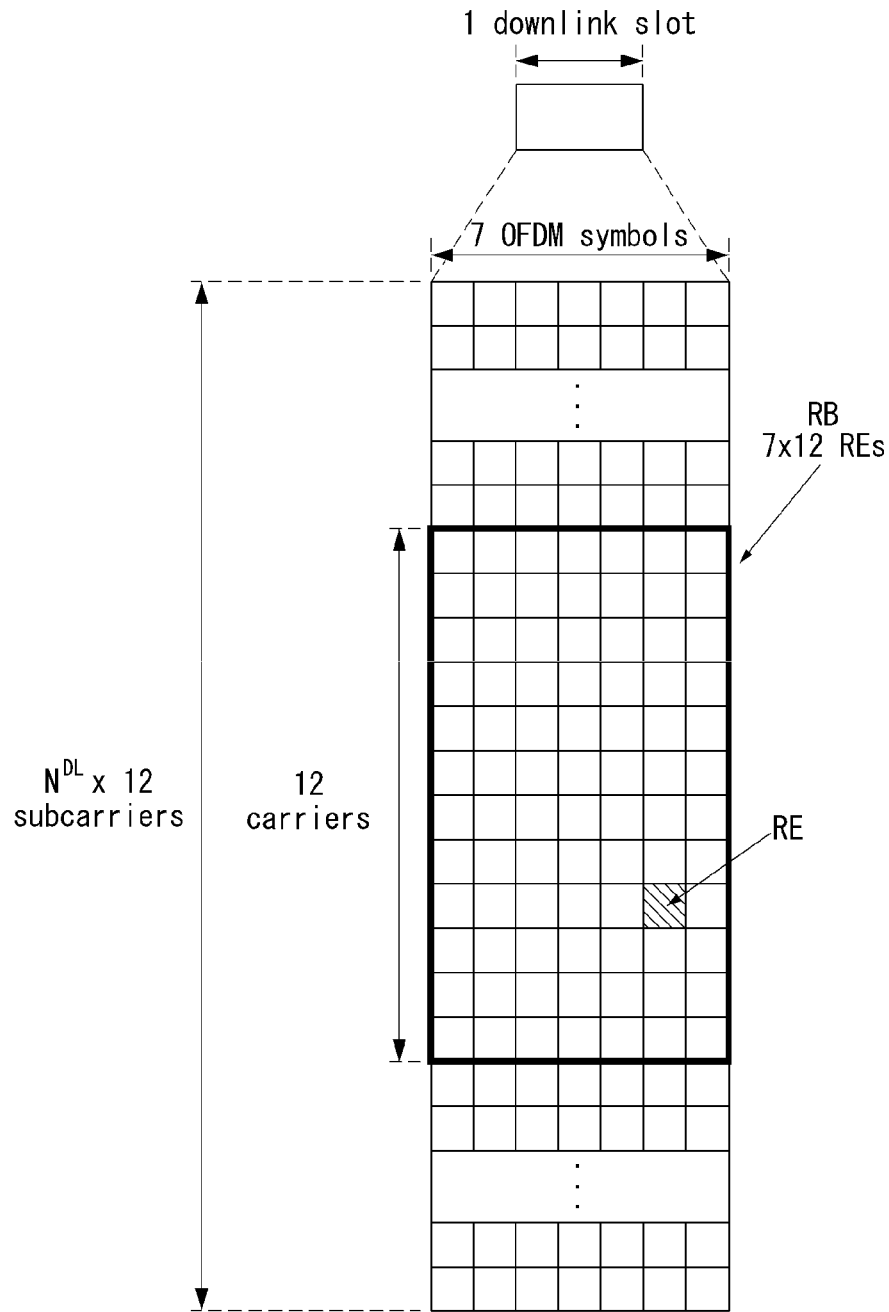
[Figure 4]

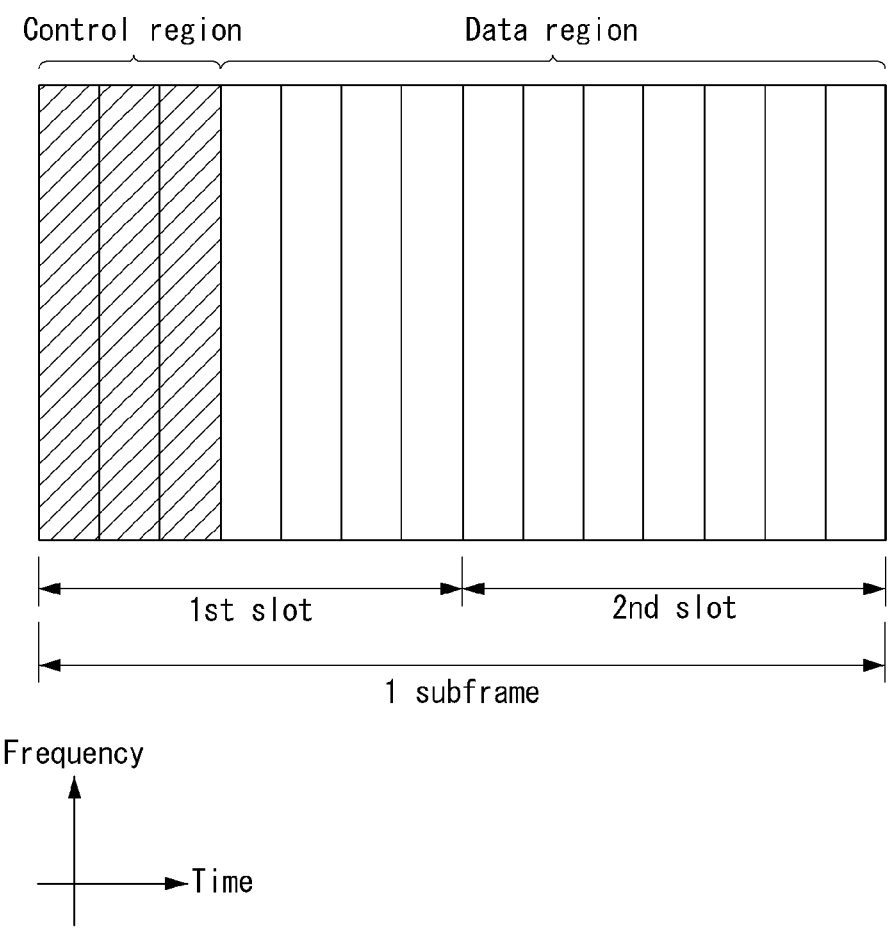

[Figure 6]
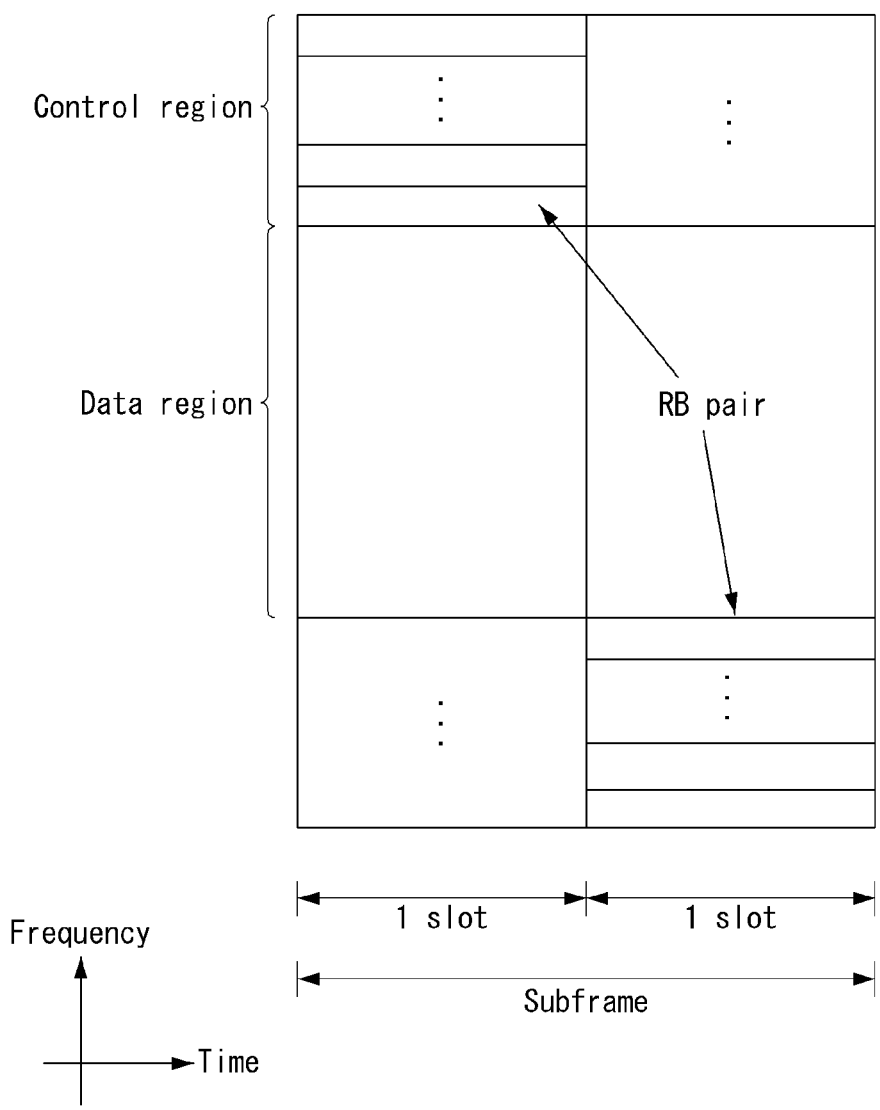

[Figure 7]
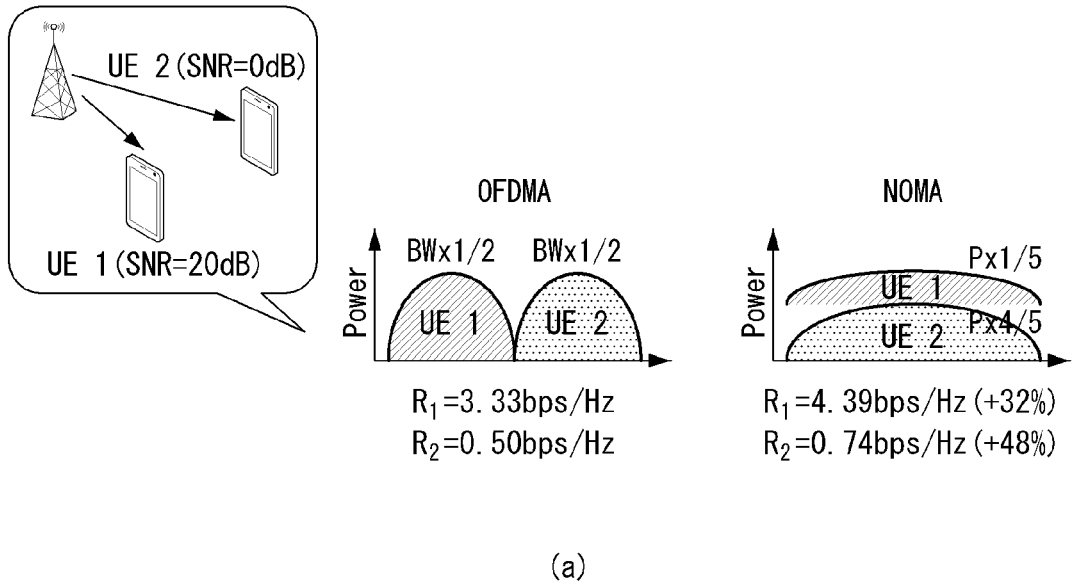
(a)
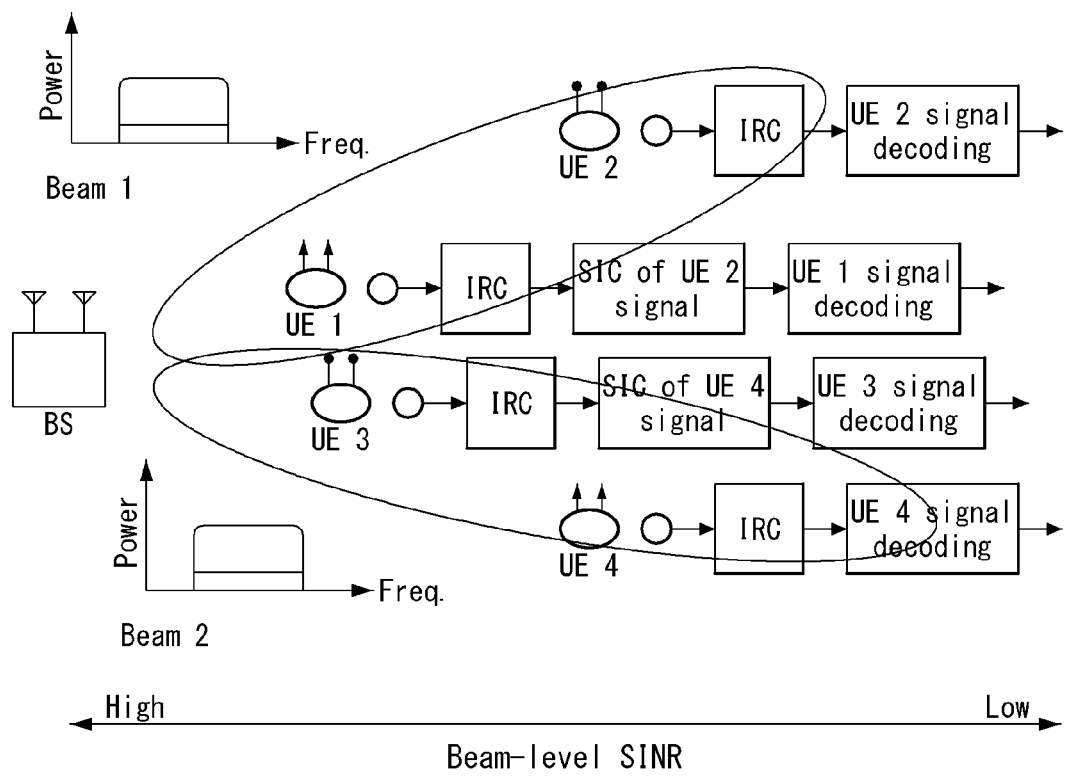
(b)

[Figure 8]
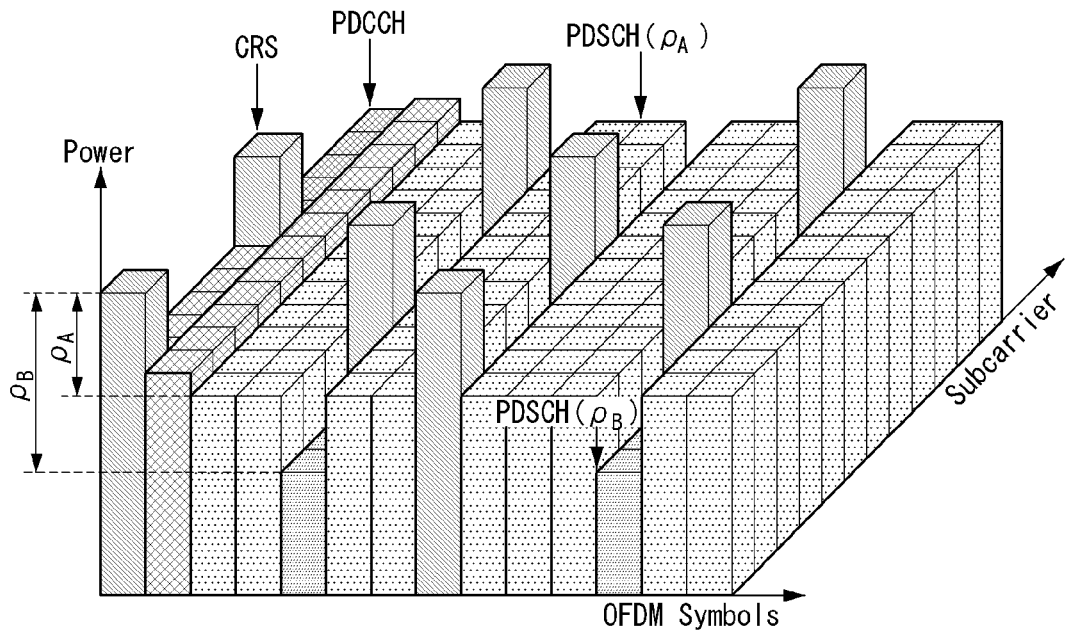
[Figure 9]
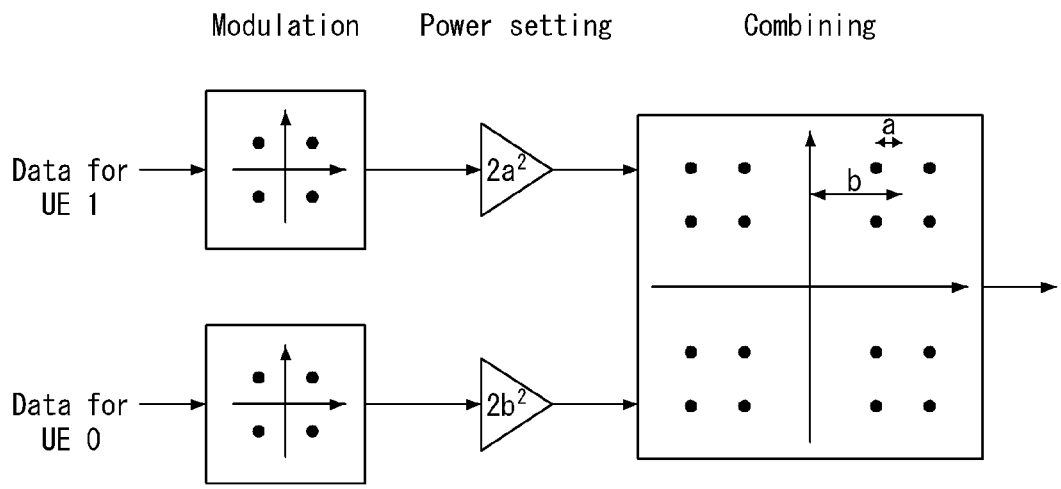

【Figure 10】
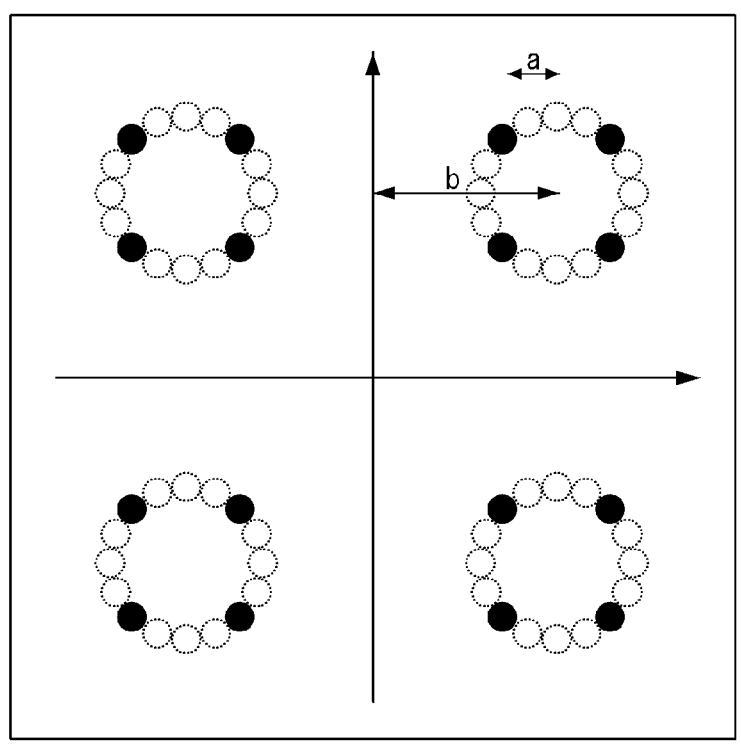
1010 — ● Legacy constellation
1020 — ○ Randomized constellation

[Figure 11]
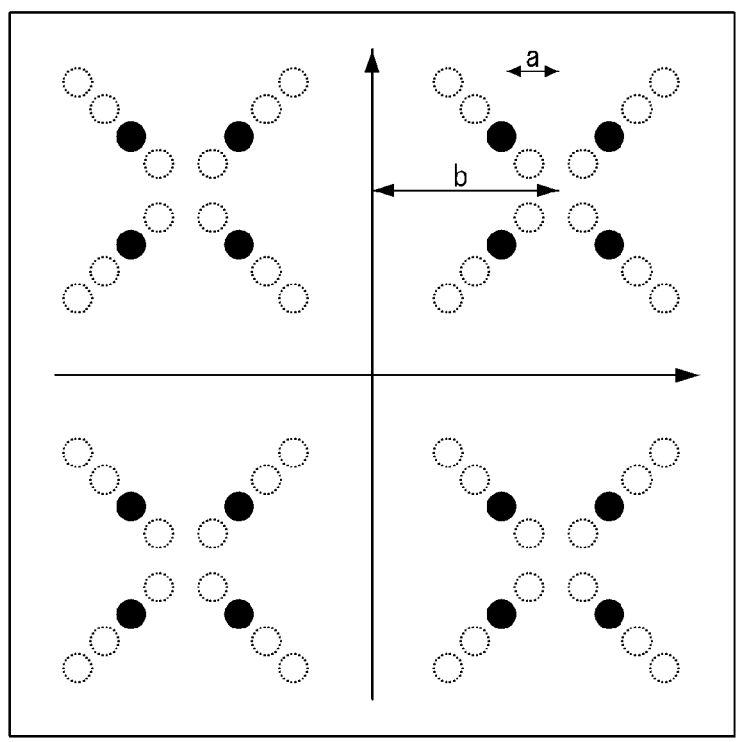
1110 — ● Legacy constellation
1120 — ○ Randomized constellation

[Figure 12]
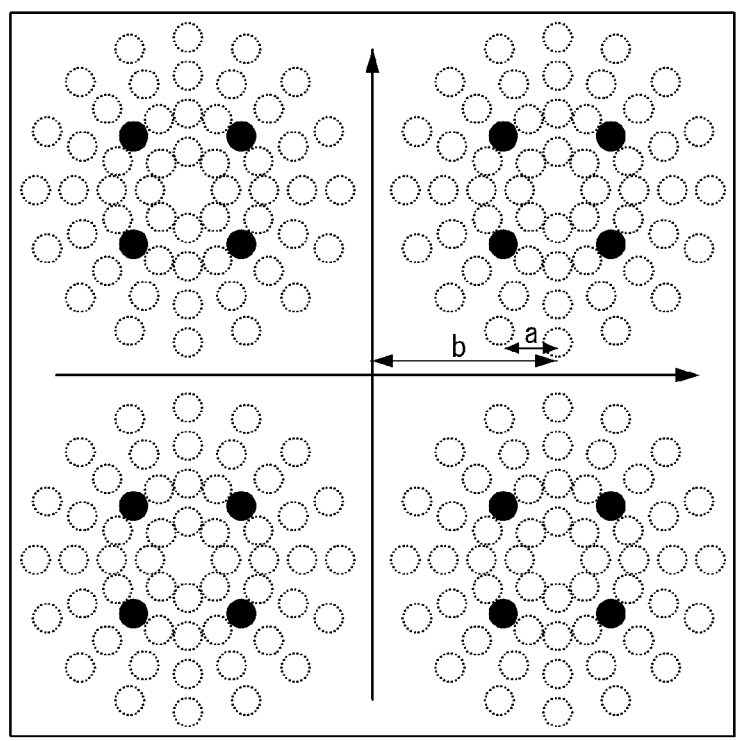
1210 — ● Legacy constellation
1220 — ○ Randomized constellation 【Figure 13】
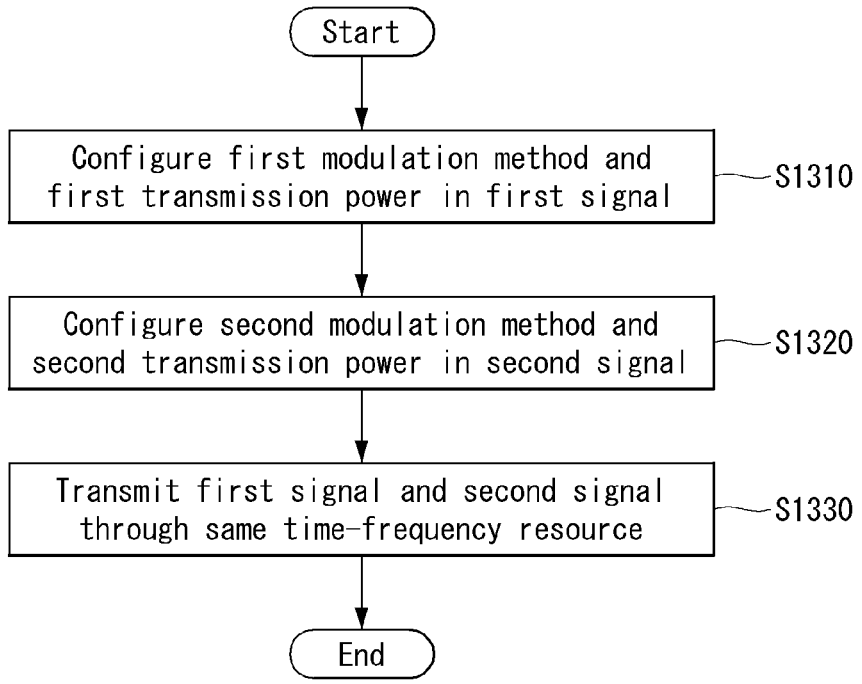
【Figure 14】
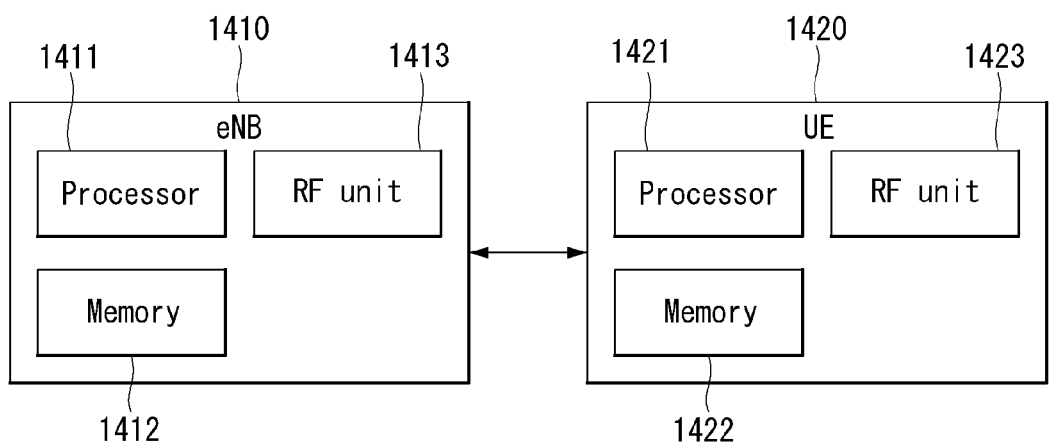

METHOD AND DEVICE FOR TRANSMITTING AND RECEIVING DATA USING NON-ORTHOGONAL MULTIPLE ACCESS IN WIRELESS COMMUNICATION SYSTEM

CROSS REFERENCE TO RELATED APPLICATIONS

This application is the National Phase of PCT International Application No. PCT/KR2016/002849, filed on Mar. 22, 2016, which claims priority under 35 U.S.C. 119(e) to U.S. Provisional Application No. 62/137,210, filed on Mar. 23, 2015, all of which are hereby expressly incorporated by reference into the present application.

TECHNICAL FIELD

The present invention relates to a wireless communication system and, more particularly, to a method for transmitting/receiving data using non-orthogonal multiple access (NOMA) and an apparatus for supporting the same.

BACKGROUND ART

Mobile communication systems have been developed to provide voice services, while guaranteeing user activity. Service coverage of mobile communication systems, however, has extended even to data services in addition to voice services. Accordingly, an explosive increase in the traffic has recently resulted in the shortage of resources and user needs for high speed services, requiring advanced mobile communication systems.

The requirements of a next-generation mobile communication system may include supporting huge data traffic, a remarkable increase in the transfer rate of each user, the accommodation of a significantly increased number of connection devices, very low end-to-end latency, and high energy efficiency. To this end, various techniques, such as small cell enhancement, dual connectivity, massive multiple input multiple output (MIMO), in-band full duplex, non-orthogonal multiple access (NOMA), supporting super-wide band, and device networking, have been researched.

DISCLOSURE

Technical Problem

An object of this specification is to provide a method for transmitting/receiving data using a hierarchical modulation (HM) method in a non-orthogonal multiple access (NOMA) system.

Specifically, an object of this specification is to improve decoding performance in an edge UE by applying randomization to a desired signal of the edge UE acting as interference with a center UE if the transmission power of a transmission signal to the center UE and the transmission power of a transmission signal to the edge UE are the same or similar.

Technical objects to be achieved by the present invention are not limited to the aforementioned objects, and those skilled in the art to which the present invention pertains may evidently understand other technological objects from the following description.

Technical Solution

In this specification, a method for transmitting/receiving data using non-orthogonal multiple access (NOMA) in a wireless communication system is performed by an eNB and includes the steps of configuring a first modulation method and first transmission power in a first signal to be transmitted to a first UE; configuring a second modulation method and second transmission power in a second signal to be transmitted to a second UE; transmitting the first signal and the second signal through an identical time-frequency resource; and transmitting control information related to a cancellation of interference generated due to the first signal to the second UE. The control information includes at least one of phase information related to a change in the phase of a modulation symbol of the second signal modulated by the second modulation method, power information related to a change in the power size of the modulation symbol of the second signal modulated by the second modulation method, and sequence information related to a random sequence for scrambling the modulation symbol of the second signal modulated by the second modulation method.

Furthermore, in this specification, the control information is transmitted if the first transmission power and the second transmission power are identical or a difference between the first transmission power and the second transmission power is within a range of a specific value.

Furthermore, in this specification, a unit of the same time-frequency resource is a resource element (RE), a resource block (RB), a resource block group (RBG) or a subband.

Furthermore, this specification further includes the step of changing at least one of the phase and power size of the modulation symbol of the second signal modulated by the second modulation method.

Furthermore, in this specification, the step of changing the phase of the modulation symbol of the second signal modulated by the second modulation method includes the steps of setting a phase value corresponding to the second modulation method as a fixed value in a resource in which data symbol mapping starts; and increasing the set phase value by a specific phase value every resource from a resource subsequent to the resource in which the data symbol mapping starts.

Furthermore, in this specification, the specific phase value is a fixed value or changed value.

Furthermore, in this specification, when the specific phase value is a changed value, the specific phase value is set based on at least one of the ID of the second UE or a subframe number in which the second signal is received.

Furthermore, in this specification, the specific value is $$\frac{46}{180}\pi.$$

Furthermore, in this specification, the step of changing the size of the power of the modulation symbol of the second signal modulated by the second modulation method includes the steps of setting the value of a power size corresponding to the second transmission power as a fixed value in a resource in which data symbol mapping starts; and changing the size of transmission power every resource based on transmission power in a previous resource or a specific function from a resource subsequent to the resource in which the data symbol mapping starts.

Furthermore, in this specification, the control information is transmitted through high layer signaling or a physical downlink channel.

Furthermore, in this specification, the phase information includes an initial phase value and a changed phase value, and the power information includes an initial power size value and a change power size value.

Furthermore, in this specification, an eNB for transmitting/receiving data using non-orthogonal multiple access (NOMA) in a wireless communication system includes a radio frequency (RF) unit for transmitting/receiving a radio signal; and a processor functionally connected to the RF unit. The processor performs control so that a first modulation method and first transmission power are configured in a first signal to be transmitted to a first UE, a second modulation method and second transmission power are configured in a second signal to be transmitted to a second UE, the first signal and the second signal are transmitted through an identical time-frequency resource, and control information related to a cancellation of interference generated due to the first signal is transmitted to the second UE. The control information includes at least one of phase information related to a change in the phase of a modulation symbol of the second signal modulated by the second modulation method, power information related to a change in the power size of the modulation symbol of the second signal modulated by the second modulation method, and sequence information related to a random sequence for scrambling the modulation symbol of the second signal modulated by the second modulation method.

Advantageous Effects

This specification has an effect in that it can improve decoding performance of a center UE by considering the signal of an edge UE acting as interference with the center UE to be Gaussian noise and decoding the signal of the edge UE if the transmission power size of a transmission signal to the center UE and the transmission power size of a transmission signal to the edge UE are the same or almost similar.

Effects which may be obtained by the present invention are not limited to the aforementioned effects, and various other effects may be evidently understood by those skilled in the art to which the present invention pertains from the following description.

DESCRIPTION OF DRAWINGS

The accompanying drawings included as part of the detailed description in order to help understanding of the present invention provide embodiments of the present invention and describe the technical characteristics of the present invention along with the detailed description.

FIG. 1 illustrates an example of the network configuration of an evolved universal terrestrial radio access network (E-UTRAN) to which an embodiment of the present invention may be applied.

FIG. 2 is a diagram for illustrating physical channels used in a 3GPP LTE/LTE-A system to which the present invention may be applied and a common signal transmission method using the same.

FIG. 3 shows the structure of a radio frame in a wireless communication system to which the present invention may be applied.

FIG. 4 is a diagram illustrating a resource grid for one downlink slot in a wireless communication system to which the present invention may be applied.

FIG. 5 shows the structure of a downlink subframe in a wireless communication system to which the present invention may be applied.

FIG. 6 shows the structure of an uplink subframe in a wireless communication system to which the present invention may be applied.

FIG. 7 shows a conceptual diagram of an interference cancellation method used in a NOMA system to which a method proposed by this specification may be applied.

FIG. 8 is a conceptual diagram showing an example of a method of controlling downlink power.

FIG. 9 is a conceptual diagram showing an example of hierarchical modulation.

FIG. 10 is a diagram showing an example of a constellation randomized using a phase difference proposed by this specification.

FIG. 11 is a diagram showing an example of a constellation randomized using a difference in the power size proposed by this specification.

FIG. 12 is a diagram showing an example of a constellation randomized using a phase difference and power (size) difference proposed by this specification.

FIG. 13 is a flowchart showing an example of a method for transmitting/receiving data using a non-orthogonal multiple access (NOMA) method proposed by this specification.

FIG. 14 illustrates a block configuration diagram of a wireless communication device to which the methods proposed by this specification may be applied.

MODE FOR INVENTION

Hereinafter, some embodiments of the present invention are described in detail with reference to the accompanying drawings. The detailed description to be disclosed herein along with the accompanying drawings is provided to describe exemplary embodiments of the present invention and is not intended to describe a sole embodiment in which the present invention may be implemented. The following detailed description includes detailed contents in order to provide complete understanding of the present invention. However, those skilled in the art will appreciate that the present invention may be implemented even without such detailed contents.

In some instances, known structures and devices are omitted, or are shown in block diagram form focusing on important features of the structures and devices, so as not to obscure the concept of the present invention.

In this specification, an enhanced Node B (eNode B or eNB) may be a terminal node of a network, which directly communicates with the terminal. In this document, a specific operation described as performed by the eNB may be performed by an upper node of the eNB. Namely, it is apparent that, in a network comprised of a plurality of network nodes including an eNB, various operations performed for communication with a terminal may be performed by the eNB, or network nodes other than the eNB. The term 'eNB' may be replaced with the term 'fixed station', 'base station (BS)', 'Node B', 'base transceiver system (BTS),', 'access point (AP)', etc. The term 'user equipment (UE)' may be replaced with the term 'terminal', 'mobile station (MS)', 'user terminal (UT)', 'mobile subscriber station (MSS)', 'subscriber station (SS)', 'Advanced Mobile Station (AMS)', 'Wireless terminal (WT)', 'Machine-Type Communication (MTC) device', 'Machine-to-Machine (M2M) device', 'Device-to-Device (D2D) device', wireless device, etc.

Hereinafter, "downlink (DL)" refers to communication from an eNB to a UE, and "uplink (UL)" refers to communication from a UE to an eNB. In downlink, a transmitter may be part of eNB, and a receiver may be part of UE. In uplink, a transmitter may be part of a UE, and a receiver may be part of an eNB.

Specific terms used for the embodiments of the present invention are provided to aid in understanding of the present invention. These specific terms may be replaced with other terms within the scope and spirit of the present invention.

Techniques described herein can be used in various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier-Frequency Division Multiple Access (SC-FDMA), 'non-orthogonal multiple access (NOMA)', etc. CDMA may be implemented as a radio technology such as Universal Terrestrial Radio Access (UTRA) or CDMA2000. TDMA may be implemented as a radio technology such as Global System for Mobile communications (GSM)/General Packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved-UTRA (E-UTRA) etc. UTRA is a part of Universal Mobile Telecommunication System (UMTS). 3GPP LTE is a part of Evolved UMTS (E-UMTS) using E-UTRA. 3GPP LTE employs OFDMA for downlink and SC-FDMA for uplink. LTE-A is an evolution of 3GPP LTE.

The embodiments of the present invention may be supported by the standard documents disclosed in at least one of IEEE 802, 3GPP and 3GPP2, that is, wireless access systems. That is, steps or portions not described to clearly disclose the technological spirit of the present invention in the embodiments of the present invention may be supported by the documents. Furthermore, all the terms disclosed in this document may be described by the standard documents.

For clarity, this application focuses on the 3GPP LTE/LTE-A system. However, the technical features of the present invention are not limited thereto.

General System

FIG. 1 illustrates a schematic structure a network structure of an evolved universal mobile telecommunication system (E-UMTS) to which the present invention can be applied.

An E-UMTS system is an evolved version of the UMTS system and may be an LTE/LTE-A system. The E-UTRAN consists of eNBs, providing the E-UTRA user plane and control plane protocol terminations towards the UE. The eNBs are interconnected with each other by means of the X2 interface. The X2 user plane interface (X2-U) is defined between eNBs. The X2-U interface provides non guaranteed delivery of user plane packet data units (PDUs). The X2 control plane interface (X2-CP) is defined between two neighbour eNBs. The X2-CP performs following functions: context transfer between eNBs, control of user plane tunnels between source eNB and target eNB, transfer of handover related messages, uplink load management and the like. Each eNB is connected to User Equipments (UEs) through a radio interface and is connected to an Evolved Packet Core (EPC) through an S1 interface. The S1 user plane interface (S1-U) is defined between the eNB and the serving gateway (S-GW). The S1-U interface provides non guaranteed delivery of user plane PDUs between the eNB and the S-GW. The S1 control plane interface (S1-MME) is defined between the eNB and the MME (Mobility Management Entity). The S1 interface performs following functions: EPS (Enhanced Packet System) Bearer Service Management function, NAS (Non-Access Stratum) Signaling Transport function, Network Sharing Function, MME Load balancing Function and the like. The S1 interface supports a many-to-many relation between MMEs/S-GWs and eNBs.

FIG. 2 illustrates physical channels used for the 3GPP LTE/LTE-A system to which the present invention can be applied and a general signal transmission method using the physical channels.

A UE, which may have been powered on again from the power-off state or may have newly entered a cell, carries out the initial cell search task such as synchronizing itself with an eNB in the S201 step. To this purpose, the UE synchronizes with the eNB by receiving a primary synchronization channel (P-SCH) and a secondary synchronization channel (S-SCH) from the eNB and obtains information such as a cell ID (identifier).

Afterwards, the UE receives a physical broadcast channel (PBCH) signal from the eNB and obtains broadcast signal within the eNB. Meanwhile, the UE receives a downlink reference signal (DL RS) in the initial cell search step to check the downlink channel status.

The UE which has finished the initial cell search receives a PDSCH according to the PDCCH and PDCCH information in the S202 step to obtain more specific system information.

Next, the UE may carry out a random access procedure such as the steps of S203 to S206 to complete a connection process to the eNB. To this purpose, the UE transmits a preamble S203 through a physical random access channel (PRACH) and receives a response message in response to the preamble through a PDSCH corresponding to the PRACH S204. In the case of contention-based random access, the UE may carry out a contention resolution procedure including transmission of an additional PRACH signal S205 and reception of a PDCCH signal and the PDSCH signal corresponding to the PDCCH signal S206.

Afterwards, the UE which has carried out the procedure above may carry out reception S207 of the PDCCH signal and/or PDSCH signal and transmission S208 of a PUSCH signal and/or a PUCCH signal as a conventional uplink/downlink signal transmission procedure.

The control information that the UE transmits to the eNB is called collectively uplink control information (UCI). The UCI includes HARQ-ACK/NACK, a scheduling request (SR), a channel quality indicator (CQI), a precoding matrix indicator (PMI), and rank indication (RI) information.

In the LTE/LTE-A system, the UCI is transmitted periodically through the PUCCH; the UCI can be transmitted through the PUSCH if control information and traffic data have to be transmitted at the same time. Also, the UCI can be transmitted non-periodically through the PUSCH according to a request or a command from the network.

FIG. 3 illustrates a structure a radio frame in a wireless communication system to which the present invention can be applied.

In 3GPP LTE/LTE-A, radio frame structure type 1 may be applied to frequency division duplex (FDD) and radio frame structure type 2 may be applied to time division duplex (TDD) are supported.

FIG. 3(a) exemplifies radio frame structure type 1. The radio frame is constituted by 10 subframes. One subframe is constituted by 2 slots in a time domain. A time required to transmit one subframe is referred to as a transmissions time interval (TTI). For example, the length of one subframe may be 1 ms and the length of one slot may be 0.5 ms.

One slot includes a plurality of orthogonal frequency division multiplexing (OFDM) symbols in the time domain and includes multiple resource blocks (RBs) in a frequency domain. In 3GPP LTE, since OFDMA is used in downlink, the OFDM symbol is used to express one symbol period. The OFDM symbol may be one SC-FDMA symbol or symbol period. The resource block is a resource allocation wise and includes a plurality of consecutive subcarriers in one slot.

FIG. 3(b) illustrates frame structure type 2. Radio frame type 2 is constituted by 2 half frames, each half frame is constituted by 5 subframes, a downlink pilot time slot (DwPTS), a guard period (GP), and an uplink pilot time slot (UpPTS), and one subframe among them is constituted by 2 slots. The DwPTS is used for initial cell discovery, synchronization, or channel estimation in a terminal. The UpPTS is used for channel estimation in a base station and to match uplink transmission synchronization of the terminal. The guard period is a period for removing interference which occurs in uplink due to multi-path delay of a downlink signal between the uplink and the downlink.

The structure of the radio frame is just one example and the number subcarriers included in the radio frame or the number of slots included in the subframe and the number of OFDM symbols included in the slot may be variously changed.

FIG. 4 is a diagram illustrating a resource grid for one downlink slot in the wireless communication system to which the present invention can be applied.

Referring to FIG. 4, one downlink slot includes the plurality of OFDM symbols in the time domain. Herein, it is exemplarily described that one downlink slot includes 7 OFDM symbols and one resource block includes 12 subcarriers in the frequency domain, but the present invention is not limited thereto.

Each element on the resource grid is referred to as a resource element and one resource block includes 12×7 resource elements. The number of resource blocks included in the downlink slot, NDL is subordinated to a downlink transmission bandwidth.

A structure of the uplink slot may be the same as that of the downlink slot.

FIG. 5 illustrates a structure of a downlink subframe in the wireless communication system to which the present invention can be applied.

Referring to FIG. 5, a maximum of three before OFDM symbols in the first slot of the sub frame is a control region to which control channels are allocated and residual OFDM symbols is a data region to which a physical downlink shared channel (PDSCH) is allocated. Examples of the downlink control channel used in the 3GPP LTE include a Physical Control Format Indicator Channel (PCFICH), a Physical Downlink Control Channel (PDCCH), a Physical Hybrid-ARQ Indicator Channel (PHICH), and the like.

The PFCICH is transmitted in the first OFDM symbol of the subframe and transports information on the number (that is, the size of the control region) of OFDM symbols used for transmitting the control channels in the subframe. The PHICH which is a response channel to the uplink transports an Acknowledgement (ACK)/Not-Acknowledgement (NACK) signal for a hybrid automatic repeat request (HARQ). Control information transmitted through a PDCCH is referred to as downlink control information (DCI). The downlink control information includes uplink resource allocation information, downlink resource allocation information, or an uplink transmission (Tx) power control command for a predetermined terminal group.

The PDCCH may transport A resource allocation and transmission format (also referred to as a downlink grant) of a downlink shared channel (DL-SCH), resource allocation information (also referred to as an uplink grant) of an uplink shared channel (UL-SCH), paging information in a paging channel (PCH), system information in the DL-SCH, resource allocation for an upper-layer control message such as a random access response transmitted in the PDSCH, an aggregate of transmission power control commands for individual terminals in the predetermined terminal group, a voice over IP (VoIP). A plurality of PDCCHs may be transmitted in the control region and the terminal may monitor the plurality of PDCCHs. The PDCCH is constituted by one or an aggregate of a plurality of continuous control channel elements (CCEs). The CCE is a logical allocation wise used to provide a coding rate depending on a state of a radio channel to the PDCCH. The CCEs correspond to a plurality of resource element groups. A format of the PDCCH and a bit number of usable PDCCH are determined according to an association between the number of CCEs and the coding rate provided by the CCEs.

The base station determines the PDCCH format according to the DCI to be transmitted and attaches the control information to a cyclic redundancy check (CRC) to the control information. The CRC is masked with a unique identifier (referred to as a radio network temporary identifier (RNTI)) according to an owner or a purpose of the PDCCH. In the case of a PDCCH for a specific terminal, the unique identifier of the terminal, for example, a cell-RNTI (C-RNTI) may be masked with the CRC. Alternatively, in the case of a PDCCH for the paging message, a paging indication identifier, for example, the CRC may be masked with a paging-RNTI (P-RNTI). In the case of a PDCCH for the system information, in more detail, a system information block (SIB), the CRC may be masked with a system information identifier, that is, a system information (SI)-RNTI. The CRC may be masked with a random access (RA)-RNTI in order to indicate the random access response which is a response to transmission of a random access preamble.

FIG. 6 illustrates a structure of an uplink subframe in the wireless communication system to which the present invention can be applied.

Referring to FIG. 6, the uplink subframe may be divided into the control region and the data region in a frequency domain. A physical uplink control channel (PUCCH) transporting uplink control information is allocated to the control region. A physical uplink shared channel (PUSCH) transporting user data is allocated to the data region. One terminal does not simultaneously transmit the PUCCH and the PUSCH in order to maintain a single carrier characteristic.

A resource block (RB) pair in the subframe are allocated to the PUCCH for one terminal. RBs included in the RB pair occupy different subcarriers in two slots, respectively. The RB pair allocated to the PUCCH frequency-hops in a slot boundary.

General Non-Orthogonal Multiple Access (NOMA)

Non-orthogonal multiple access (NOMA) basically refers to a multiple access scheme capable of obtaining excellent bandwidth efficiency by additionally allocating the same frequency-time resources to a plurality of UEs at a power ratio that has been previously considered and reducing interference between users that has been previously considered through an interference cancellation receiver compared to a method of allocating resources in the frequency-time domain in an existing OFDMA system under the premise of the interference cancellation receiver.

The NOMA is a new radio access technology and has been mentioned as an important candidate technology of a 5G system in the future.

FIG. 7 shows a conceptual diagram of an interference cancellation method used in a NOMA system to which a method proposed by this specification may be applied.

As shown in FIG. 7, an important configuration technology of the NOMA system may be basically divided into (1) a resource allocation method of an eNB and (2) an interference cancellation method of a UE.

In this case, the interference cancellation method of a UE may include various forms, such as 1) a symbol-level interference cancellation receiver, 2) a maximum likelihood (ML) receiver, 3) a symbol-level interference cancellation (IC) receiver, 4) a codeword level interference cancellation (CWIC) receiver, 5) an MMSE-based linear CWIC (L-CWIC) and 6) ML-CWIC.

The received gain of a UE is different in a given environment depending on each interference cancellation scheme. In general, a gain if the ML scheme has been applied and in the CWIC type receiver is great in proportion to the implementation complexity of a UE.

Downlink Power Control

In a wireless communication system, such as 3GPP LTE (-A), in order to allocate power of downlink resources, an energy per resource element (EPRE), that is, an energy value for each resource element, is defined.

In this case, a value that is a criterion is the EPRE of a cell-specific reference signal (CRE). The CRS EPRE is determined as a high layer signal and has a fixed value within a downlink system bandwidth and subframe.

In an LTE(-A) system, the EPRE of the resources of a physical data shared channel (PDSCH) through which actual data is transmitted may be expressed as a specific ratio of the CRS EPRE.

For example, in an orthogonal frequency division modulation (OFDM) symbol not including a CRS, the ratio of a CRS EPRE to a PDSCH EPRE is defined as $\rho_A$. In an OFDM symbol including a CRS, the ratio of a CRS EPRE to a PDSCH EPRE is defined as $\rho_B$.

FIG. 8 is a conceptual diagram showing an example of a method of controlling downlink power.

In FIG. 8, a traverse axis indicates an OFDM symbol, a longitudinal axis indicates a subcarrier, and the height indicates s power.

In FIG. 8, $\rho_A$ is determined by a power offset $\delta_{power\text{-}offset}$ and $\rho_A$, that is, a UE-specific variable, depending on whether a multiple input multiple output (MIMO) scheme has been applied or not. $\rho_A/\rho_B$ is determined by the number of antenna ports and a cell-specific variable $\rho_B$.

In the current LTE system (i.e., Rel-10), $\rho_A$ is basically differently defined with respect to two types.

First, when PDSCH data is transmitted by applying a transmit diversity scheme using four cell-common antenna ports, $\rho_A$ is determined by Equation 1 below.

$$\rho_A = \delta_{power\text{-}offset} + \rho_A + 10 \log_{10} 2 \text{ [dB]} \quad \text{[Equation 1]}$$

In Equation 1, $\delta_{power\text{-}offset}$ indicates a power offset value for supporting an MU-MIMO operation and is set to 0 dB in other PDSCH transmission cases.

Furthermore, $P_A$ means a UE-specific variable as described above.

In other cases other than the aforementioned transmit diversity-based PDSCH transmission, $\rho_A$ is defined as in Equation 2 below.

$$\rho_A = \delta_{power\text{-}offset} + P_A \text{[dB]} \quad \text{[Equation 2]}$$

Hierarchical Modulation

FIG. 9 is a conceptual diagram showing an example of hierarchical modulation.

Hierarchical modulation (HM) is described in brief below with reference to FIG. 9.

The HM may be called or expressed as layered modulation.

The HM is one of technologies for multiplexing and modulating a plurality of data streams into a single symbol stream.

In this case, base-layer subsymbols and enhancement-layer subsymbols are synchronized prior to transmission and thus superimposed.

If hierarchical modulation is applied, a user or user terminal having better reception and an enhanced receiver can demodulate and decode one or more data streams.

A user terminal having an existing receiver or poor reception can demodulate and decode only a data stream transmitted in a low layer (e.g., a base layer).

From an information-theory viewpoint, hierarchical modulation is handled as one practical implementation in superposition precoding and has been proposed to achieve a maximum sum rate of a Gaussian broadcast channel having a successful interference cancellation in a reception stage (or receiver).

From a network operation viewpoint, a network operator may continuously target user terminals having different services or QoS when hierarchical modulation is applied.

However, the ratio of existing hierarchical modulation which may be achieved by low-layer data streams (e.g., base layer data streams) is reduced due inter-layer interference (ILI) from a high layer signal(s).

For example, with respect to two-layer symbols which include a 16QAM base layer and a QPSK enhancement layer and which have been hierarchically modulated, a base-layer throughput loss attributable to inter-layer interference may rises up to about 1.5 bits/symbol if the entire signal-to-noise ratio (SNR) is about 23 dB.

This means that an achievable throughput loss of the base layer is about 37.5% (1.5/4) in the 23 dB SNR.

In contrast, the demodulation error rate of any one of the base-layer and enhancement-layer symbols is also increased.

A method of randomizing an interference signal for non-orthogonal multiple access (NOMA) proposed by this specification is described in detail below with reference to related drawings.

In an LTE(-A) environment, a NOMA downlink (DL) system may be implemented by simultaneously transmitting a signal 1 corresponding to a desired signal transmitted from an eNB to an edge UE (e.g., UE0) and a signal 2 corresponding to a desired signal transmitted to a center UE (e.g., UE1) using a superposition coding scheme.

The superposition coding scheme may be hierarchical modulation (HM), for example.

First, from a viewpoint of a UE, in the case of a common reference signal (CRS)-based transmission scheme, the ratio of data power to CRS power, that is, $\rho_A$, $\rho_B$, may be calculated using $\rho_A$, $\rho_B$, as described in General NOMA.

The UE1 (center UE) that has received additional power information for NOMA from the eNB may calculate power of the signal 2 (the desired signal of the UE1) and power of the signal 1 (an interference signal, the desired signal of the UE0) based on the values $\rho_A$ and $\rho_B$.

Meanwhile, from a viewpoint of the eNB, assuming that transmission power of the signal 1 is $P_0$, transmission power of the signal 2 is $P_1$, and total transmission power of the eNB is $P_T$ ($P_T = P_0 + P_1$), the ratio of $P_T$ to $P_0$ may be defined as a power ratio $\alpha$. The power ratio $\alpha$ may be defined as in Equation 3 below.

$$\alpha = \frac{P_0}{P_T}, (0 \leq \alpha \leq 1) \qquad \text{[Equation 3]}$$

In Equation 3, if a is 1, $P_1=0$ and $P_0=P_T$.

Accordingly, the total transmission power may be construed as being used in the desired signal of the UE0, that is, the signal 1.

Furthermore, if α is 0, $P_1=P_T$ and $P_0=0$. Accordingly, the total transmission power may be construed as being used in the desired signal of the UE1, that is, the signal 2.

In general, $P_0$ may be set greater than $P_1$ because a channel state between the UE1 and the eNB may be said to be better than that between the UE0 and the eNB. In this case, the value α may have a value, such as $0.5 \leq \alpha \leq 1$.

Meanwhile, when the value α is set close to 0.5, the size of $P_1$ is almost the same as that of $P_0$ (e.g., when α=0.5, $P_1=0.5*PT$, $P_0=0.5*P_T$), from a viewpoint of the UE0, the desired signal (signal 1) of the UE0 may experience great interference in a specific power (size) and specific phase due to the desired signal (signal 2) of the UE1 (from a viewpoint of a modulation symbol).

Accordingly, as a result, it may be difficult for the UE0 to decode the signal 1 because the signal 1 is considered to be Gaussian noise.

Accordingly, this specification provides a method of decoding the desired signal of the UE0 by considering the signal 2 to be Gaussian noise in such a manner that the power (size) and phase of the modulation symbol of the desired signal (signal 2) of the UE1 acting as interference is changed at a specific interval according to a specific rule known to the eNB and the UE1.

A method of changing the signal of a counterpart UE into Gaussian noise, proposed by this specification, may be basically divided into (1) a method of changing a phase, (2) a method of changing power (size), (3) a method of simultaneously changing a phase and power (size), and (4) a scrambling method using a random sequence, that is, four methods.

Method 1: Method of Changing Phase of Signal

The method 1 is a method of changing the phase of a modulation symbol of the desired signal (signal 1) of the UE1 according to a specific rule known to the eNB and the UE1.

A phase changed according to a specific rule is hereinafter called or expressed as a 'phase difference' or 'change phase', for convenience sake.

As an example for the method 1, in a resource element (RE) in which the data symbol mapping of each resource block (RB) starts, the phase difference value of the signal 2 may be set as a previously agreed value A.

Thereafter, the phase difference of an RE next to the RE in which the data symbol mapping starts may be increased and set by a fixed value, such as $$\frac{46}{180}\pi.$$

Accordingly, the phase difference of an i-th RE in which data symbol mapping is performed in each RB may be generated and expressed as $$\left(A + i \times \frac{46}{180}\pi\right).$$

In this case, the fixed value $$\frac{46}{180}\pi,$$

that is, an example, is set based on $$\frac{\pi}{4}$$

which may be located between existing constellations because the configuration of an existing constellation (QPSK, 16QAM, 64QAM, etc.) is disposed at intervals of $$\frac{\pi}{2},$$

and may be set as a value greater than $$\frac{\pi}{180}$$

greater than the value $$\frac{\pi}{4}.$$

Accordingly, the fixed value is set so that it has all of phase values having resolution of $$\frac{\pi}{180}$$

for each RE.

As described above, a phase difference having resolution of a previously agreed value δ may be set based on a previously agreed value θ.

For another example, in an RE in which the data symbol mapping of each resource block (RB) starts, a phase difference value starts at a previously agreed value A. The phase difference of a next RE after the data symbol was mapped may be set as a value which varies depending on the results of a previously agreed function between the eNB and the UE1 based on the ID of the UE1 and a current subframe number.

If a phase difference value is set as a value varying as described above, the UE1 can decode the signal 2 corresponding to the desired signal of the UE1 because the eNB and the UE1 assume that they are accurately aware of the phase difference value.

Furthermore, the UE0 considers the interference of the UE1 to be Gaussian noise compared to an existing method because the phase of the desired signal of the UE1, that is, the signal 2 acting as interference in a conventional technology, is shifted for each RE, thus being capable of expecting performance improvement for the decoding of the signal 1.

FIG. 10 is a diagram showing an example of a constellation randomized using a phase difference proposed by this specification.

In FIG. 10, a dark portion 1010 shows a legacy constellation, and a portion 1020 indicated by a dotted line shows a randomized constellation.

Method 2: Method of Changing Power Size of Signal

The method 2 is a method of controlling the power (size) of a modulation symbol of the desired signal of the UE1, that is, the signal 2, according to a specific rule known to the eNB and the UE1.

Power (size) changed according to a specific rule is hereinafter called or expressed as a 'power difference' or 'changed power', for convenience sake.

As an example for the method 2, in an RE in which the data symbol mapping of each resource block (RB) starts, a power difference value may be set as A.

Thereafter, the power difference of an RE next to the RE in which the data symbol mapping starts may be set as a fixed value, such as "a*$P_{1,previous}$."

In this case, "a" may indicate a previously agreed constant, and $P_{1,previous}$ may indicate transmission power of a right-before RE.

For another example, in an RE in which the data symbol mapping of each resource block (RB) starts, a power difference value may start from A. The power difference of an RE to which a next data symbol has been mapped may be set as a varying value, such as "F(x, y, . . . ,)*$P_{1,previous}$."

In this case, F(x, y, . . . ,) may indicate a previously agreed function, the input of the corresponding function may be the ID of the UE1 or a current subframe number, and $P_{1,previous}$ may indicate transmission power of a right-before RE.

If the power difference is set as described above, the UE1 has no great difficult in decoding its desired signal, that is, the signal 2, because the UE1 and the eNB assume that they are accurately aware of the power difference value.

Furthermore, the UE0 considers the interference of the UE1 to be Gaussian noise compared to an existing method because the power (size) of the desired signal of the UE1 (signal 2) acting as interference in a conventional technology is controlled for each RE, thus being capable of expecting performance improvement for the decoding of the signal 1.

FIG. 11 is a diagram showing an example of a constellation randomized using a difference in the power size proposed by this specification.

In FIG. 11, a dark portion 1110 shows a legacy constellation, and a portion 1120 indicated by a dotted line shows a randomized constellation.

Method 3: Method of Simultaneously Changing Phase and Power Size of Signal

The method 3 is a method of applying the method 1 and the method 2 together.

That is, the method 3 is a method of changing the phase and power (size) of a modulation symbol of the desired signal of the UE1 (signal 2) according to a specific rule known to the eNB and the UE1.

As an example for the method 3, in an RE in which the data symbol mapping of each resource block (RB) starts, a phase difference value starts at a previously agreed value A and a power difference value starts at a previously agreed value B. The phase difference of a next RE after the data symbol was mapped may be set as a fixed value, such as $$\frac{46}{180}\pi,$$

and the power difference thereof may be set as a fixed value, such as a*$P_{1,previous}$ ("a" is a previously agreed constant and $P_{1,previous}$ is transmission power of a right-before RE).

For another example, in an RE in which the data symbol mapping of each resource block (RB) starts, a phase difference value starts at a previously agreed value A and a power difference value starts at a previously agreed value B. The phase difference of a next RE after the data symbol was mapped may be set as a value varying depending on the results of a previously agreed function and the power difference thereof may be set as a value, such as F(A, B, . . . ,)*$P_{1,previous}$, based on the ID of the UE1 and a current subframe number.

As in the method 2, F(x, y, . . . ,) may indicate a previously agreed function, the input of the corresponding function may be the ID of the UE1 or a current subframe number, and $P_{1,previous}$ may indicate transmission power of a right-before RE.

For another example, one of the phase difference and the power difference may be set as a fixed value, and the other thereof may be set as a varying value.

That is, if the phase difference and the power difference are set as described above, the UE1 has no great difficulty in decoding its desired signal, that is, the signal 2, because the eNB and the UE1 assume that they are accurately ware of the phase difference value and the power difference value.

The UE0 considers the interference of the UE1 to be Gaussian noise compared to an existing method because the phase of the desired signal of the UE1 (signal 2) acting as interference in a conventional technology is shifted for each RE and the power (size) of the desired signal of the UE1 (signal 2) is controlled, thus being capable of expecting performance improvement for the decoding of the signal 1.

FIG. 12 is a diagram showing an example of a constellation randomized using a phase difference and power (size) difference proposed by this specification.

In FIG. 12, a dark portion 1210 shows a legacy constellation and a portion 1220 indicated by a dotted line shows a randomized constellation.

Method 4: Scrambling Method Using Random Sequence

The method 4 is a method of performing complex scrambling on the phase of a modulation symbol of the desired signal of the UE1 (signal 2) based on previously agreed n-PSK (n=$2^i$, i=3, 4, . . . ) using a sequence generated using a random number generator known to the eNB and the UE1.

The sequence generated using the random number generator may be a pseudo random number (PN) sequence, for example.

The reason why in the n value of n-PSK, n=2 and 4 is excluded is that if complex scrambling is performed according to BPSK and QPSK, it may have the meaning of randomization because the configuration of an existing constellation (e.g., QPSK, 16QAM or 64QAM) is disposed at interval of $$\frac{\pi}{2}.$$

As an example for the method 4, complex scrambling may be performed on all of REs in which the data symbol mapping of each resource block (RB) has been performed using one constellation value of n-PSK constellations corresponding to a corresponding sequence value based on a PN sequence A(m) (m is the length of a sequence) known to the eNB and the UE1.

In this case, the length of the PN sequence may have an agreed size set so that randomization can be initialized.

If setting is performed as described above, the UE1 has no great difficulty in decoding its desired signal (signal 2) because the eNB and the UE1 assume that they are accurately aware of the PN sequence and the n-PSK constellation.

Furthermore, the UE0 considers the interference of the UE1 to be Gaussian noise compared to an existing method because the desired signal of the UE1 (signal 2) acting as interference in a conventional technology is subjected to complex scrambling for each RE, thus being capable of expecting performance improvement when decoding the signal 1.

As described in the method 1 to the method 4, the signal 2 may be randomized for each RE, but may be randomized for each greater resource unit (e.g., an RB, a resource block group (RBG) or a subband).

Furthermore, the UE1 can expect that error propagation is reduced if randomization is set to be periodically initialized when a size (an interval greater than a basic unit) agreed between the eNB and the UE1 is exceeded although which resource unit is used.

Furthermore, the phase difference value and power difference value in the method 1 to the method 4 may be set to be formed in a table form, such as a phase difference table and power difference table known to the eNB and the UE1.

In this case, a corresponding phase difference value and power difference value may be determined while changing an index for each resource unit within each set table.

Furthermore, in order for the method 1 to the method 4 to operate successfully, the UE1 may receive a variety of the aforementioned information (e.g., the initial phase value, initial power value, phase difference, power difference, PN sequence, n-PSK constellation and table index) through a specific message or channel from the eNB.

The specific message or channel may be high layer signaling (e.g., RRC signaling), a new field on a predetermined channel (e.g., a PDSCH), and a new combination of existing field values on a predetermined channel, for example.

If the method 1 to the method 4 are expressed as simple equations, they may be defined as in Equations 4 and 5.

Assuming that a signal received by the UE0 is $y_0$, a channel between the eNB and the UE0 is $H_0$, the desired signal of the UE1 is $x_1$ (the signal 2), the desired signal of the UE0 is $x_0$ (the signal 1), and the additive white Gaussian noise (AWGN) of the UE0 is $n_0$, $y_0$ may be defined as in Equation 4 below.

$$y_0 = H_0 x_0 + H_0 x_1 + n_0 \quad \text{[Equation 4]}$$

If an ideal channel estimation situation is assumed, if the UE0 takes $H_0^{-1}$ on Eon the basis of Equation 4 in order to decode $x_0$, it may be expressed as in Equation 5 below.

$$H_0^{-1} y_0 = x_0 + x_1 + H_0^{-1} n_0 \quad \text{[Equation 5]}$$

In this case, if the method 1 to the method 4 are used, there is an effect in that the second term $x_1$ on the right hand side of Equation 5 is randomized.

As a result, the UE0 can expect performance improvement compared to an existing method if it considers $x_1$ to be Gaussian noise like $H_0^{-1} n_0$ and decodes $x_0$.

In addition, the aforementioned methods (method 1 to method 4) may be applied to not only the UE1, but the UE0 and may be applied to the UE0 and the UE1 at the same time using a different phase difference, a power difference, a PN sequence and so on.

FIG. 13 is a flowchart showing an example of a method for transmitting/receiving data using a non-orthogonal multiple access (NOMA) method proposed by this specification.

First, in order to transmit/receive data using non-orthogonal multiple access (NOMA) in a wireless communication system, an eNB configures a first modulation method and first transmission power in a first signal to be transmitted to a first UE (S1310).

In this case, the first UE may mean the UE0 corresponding to the aforementioned center UE, and the first signal may mean the desired signal of the UE0, that is, the first signal.

Furthermore, the first transmission power may mean transmission power of the first signal.

Furthermore, the eNB configures a second modulation method and second transmission power in a second signal to be transmitted to a second UE (S1320).

In this case, the second UE may mean the UE1 corresponding to the aforementioned edge UE, and the second signal may mean the desired signal of the UE1, that is, the second signal.

Furthermore, the second transmission power may mean transmission power of the second signal.

Thereafter, the eNB maps the first signal and the second signal to the same time-frequency resource and transmits them to the first UE and/or the second UE (S1330).

In this case, the eNB transmits control information related to the cancellation of interference generated in the second UE due to the first signal.

The control information includes at least one of phase information related to a change in the phase of a modulation symbol of the second signal modulated by the second modulation method, power information related to a change in the power size of the modulation symbol of the second signal modulated by the second modulation method, and sequence information related to a random sequence for scrambling the modulation symbol of the second signal modulated by the second modulation method.

The phase information may include an initial phase value and a changed phase value, and the power information may include an initial power size value and a change power size value.

Furthermore, the control information may be transmitted through high layer signaling or a physical downlink channel.

Specifically, the physical downlink channel may be a PDSCH.

Furthermore, the control information may be transmitted only when the first transmission power and the second transmission power are the same or a difference between the first transmission power and the second transmission power falls within a range of a specific value.

The unit of the same time-frequency resource may be a resource element (RE), a resource block (RB), a resource block group (RBG) or a subband.

Furthermore, if control information is transmitted, the eNB may change at least one of the phase or power size of a modulation symbol of the second signal modulated by the second modulation method.

Specifically, in order for the eNB to change the phase of the modulation symbol of the second signal modulated by the second modulation method, the eNB may set a phase value corresponding to the second modulation method as a fixed value in a resource in which data symbol mapping starts and may increase the set phase value by a specific phase value every resource from a resource subsequent to the resource in which the data symbol mapping starts.

The specific phase value may be a fixed value or changed value.

In this case, if the specific phase value is a changed value, the specific phase value may be set based on at least one of the ID of the second UE and a subframe number in which the second signal is received.

The specific value may be a value $$\frac{46}{180}\pi,$$

for example.

Furthermore, in order for the eNB to change the power size of the modulation symbol of the second signal modulated by the second modulation method, the eNB may set the value of a power size corresponding to the second transmission power as a fixed value in a resource in which data symbol mapping starts and may change the size of the transmission power based on transmission power in a previous resource or a specific function from a resource subsequent to the resource in which the data symbol mapping starts.

General Device to which the Present Invention May be Applied

FIG. 14 illustrates a block configuration diagram of a wireless communication device to which the methods proposed by this specification may be applied.

Referring to FIG. 14, the wireless communication system includes an eNB 1410 and a plurality of UEs 1420 located within the area of the eNB 1410. In this case, the UE 1420 may correspond to the aforementioned terminal, node, device, RRH, relay, TP/RP or RSU.

The eNB 1410 includes a processor 1411, memory 1412 and a radio frequency (RF) unit 1413. The processor 1411 implements the functions, processes and/or methods proposed in FIGS. 1 to 13. The layers of a radio interface protocol may be implemented by the processor 1411. The memory 1412 is connected to the processor 1411 and stores a variety of types of information for driving the processor 1411. The RF unit 1413 is connected to the processor 1411 and transmits and/or receives a radio signal.

The UE 1420 includes a processor 1421, memory 1422 and an RF unit 1423. The processor 1421 implements the functions, processes and/or methods proposed in FIGS. 1 to 13. The layers of a radio interface protocol may be implemented by the processor 1421. The memory 1422 is connected to the processor 1421 and stores a variety of types of information for driving the processor 1421. The RF unit 1423 is connected to the processor 1421 and transmits and/or receives a radio signal.

The memory 1412, 1422 may be located inside or outside the processor 1411, 1421 and may be connected to the processor 1411, 1421 by means of well-known various means. Furthermore, the eNB 1410 and/or the UE 1420 may have a single antenna or multiple antenna.

In the aforementioned embodiments, the elements and characteristics of the present invention have been combined in specific forms. Each of the elements or characteristics should be considered to be optional unless otherwise described explicitly. Each of the elements or characteristics may be implemented without being combined with other elements or characteristics. Furthermore, some of the elements and/or the characteristics may be combined to form an embodiment of the present invention. The sequence of the operations described in connection with the embodiments of the present invention may be changed. Some of elements or characteristics in an embodiment may be included in another embodiment or may be replaced with corresponding elements or characteristics in another embodiment. It is evident that in the claims, claims not having an explicit citation relation may be combined to form one or more embodiments or may be included as one or more new claims by amendments after filing an application.

An embodiment of the present invention may be implemented by various means, for example, hardware, firmware, software or a combination of them. In the case of implementations by hardware, an embodiment of the present invention may be implemented using one or more application-specific integrated circuits (ASICs), digital signal processors (DSPs), digital signal processing devices (DSPDs), programmable logic devices (PLDs), field programmable gate arrays (FPGAs), processors, controllers, microcontrollers and/or microprocessors.

In the case of an implementation by firmware or software, an embodiment of the present invention may be implemented in the form of a module, procedure, or function for performing the aforementioned functions or operations. Software code may be stored in memory and driven by a processor. The memory may be located inside or outside the processor, and may exchange data with the processor through a variety of known means.

It is evident to those skilled in the art that the present invention may be materialized in other specific forms without departing from the spirit and essential characteristics of the present invention. Accordingly, the detailed description should not be construed as being limited from all aspects, but should be considered to be illustrative. The range of right of the present invention should be determined by reasonable analysis of the attached claims, and all changes within the equivalent scope of the present invention are included in the range of right of the present invention.

INDUSTRIAL APPLICABILITY

In the wireless communication system of the present invention, the scheme for transmitting/receiving data has been illustrated as being applied to the 3GPP LTE/LTE-A systems, but may be applied to various wireless communication systems in addition to the 3GPP LTE/LTE-A system.

The invention claimed is:

1. A method for transmitting and receiving, by an evolved NodeB (eNB), a data using non-orthogonal multiple access (NOMA) in a wireless communication system, the method comprising:
configuring a first modulation method and a first transmission power in a first signal to be transmitted to a first user equipment (UE);
configuring a second modulation method and a second transmission power in a second signal to be transmitted to a second UE;
changing a phase of a modulation symbol of the second signal modulated by the second modulation method;
transmitting, to the second UE, control information related to a cancellation of interference generated due to the first signal,
wherein the control information comprises phase information for the changed phase of the modulation symbol of the second signal; and
transmitting the first signal and the second signal on an identical time-frequency resource,
wherein the control information is transmitted if the first transmission power and the second transmission power are identical or a difference between the first transmission power and the second transmission power is within a range of a specific value,
wherein the changing further comprises:
setting a phase value corresponding to the second modulation method as a fixed value in a resource for which a data symbol mapping starts; and
increasing the set phase value by a specific phase value for every resource from a resource after the resource for which the data symbol mapping starts, and
wherein the specific phase value is $$\frac{46}{180}\pi.$$

2. The method of claim 1, wherein a unit of the identical time-frequency resource is a resource element (RE), a resource block (RB), a resource block group (RBG) or a subband.

3. The method of claim 1, wherein the specific phase value is a fixed value or changed value.

4. The method of claim 3, wherein when the specific phase value is a changed value, the specific phase value is set based on at least one of an ID of the second UE or a subframe number in which the second signal is received.

5. The method of claim 1, wherein the control information is transmitted through a higher layer signaling or a physical downlink channel.

6. An evolved NodeB (eNB) for transmitting and receiving a data using non-orthogonal multiple access (NOMA) in a wireless communication system, the eNB comprising:
a transmitter configured to transmit a radio signal;
a receiver configured to receive the radio signal; and
a processor configured to control the transmitter and the receiver,
wherein the processor:
configures a first modulation method and a first transmission power in a first signal to be transmitted to a first user equipment (UE);
configures a second modulation method and a second transmission power in a second signal to be transmitted to a second UE;
changes a phase of a modulation symbol of the second signal modulated by the second modulation method;
transmits, to the second UE, control information related to a cancellation of interference generated due to the first signal,
wherein the control information comprises phase information for the changed phase of the modulation symbol of the second signal; and
transmits the first signal and the second signal on an identical time-frequency resource,
wherein the control information is transmitted if the first transmission power and the second transmission power are identical or a difference between the first transmission power and the second transmission power is within a range of a specific value,
wherein the controller changes the phase of the modulation symbol of the second signal by:
setting a phase value corresponding to the second modulation method as a fixed value in a resource for which a data symbol mapping starts; and
increasing the set phase value by a specific phase value for every resource from a resource after the resource for which the data symbol mapping starts, and
wherein the specific phase value is $$\frac{46}{180}\pi.$$

* * * * *